Aug. 1, 1939.    G. L. REES    2,168,172
CABINET RACK
Filed Sept. 11, 1936    2 Sheets-Sheet 2
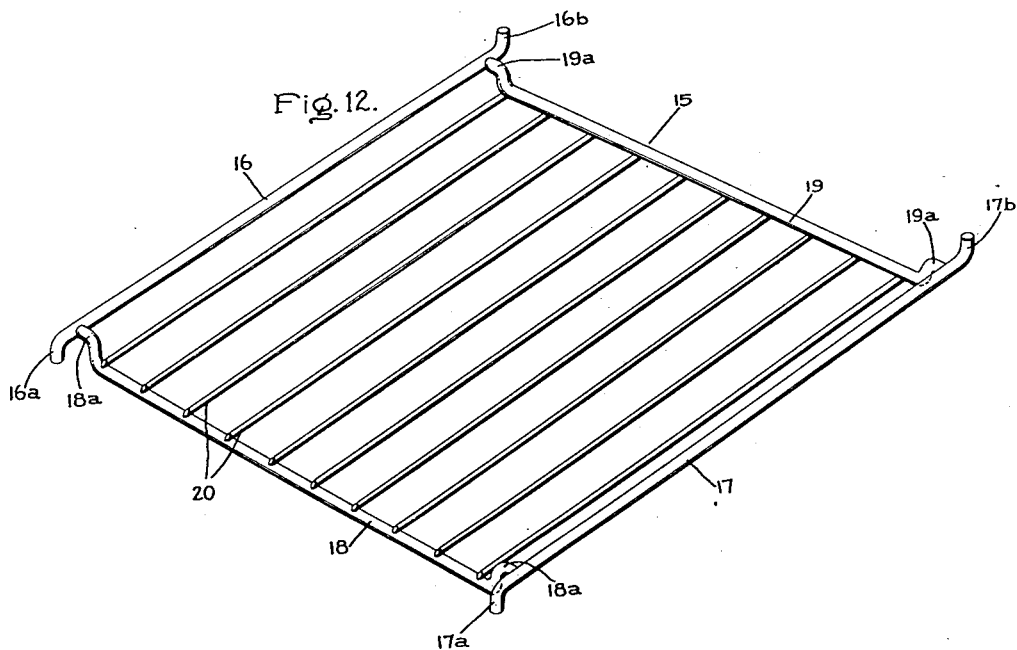
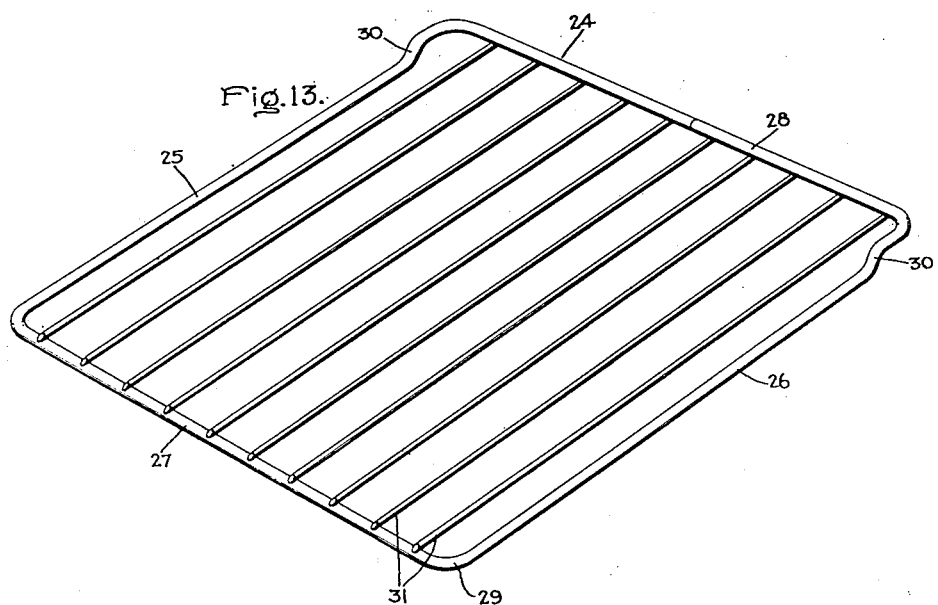
Inventor:
Gregory L. Rees,
by Harry E. Dunham
His Attorney.

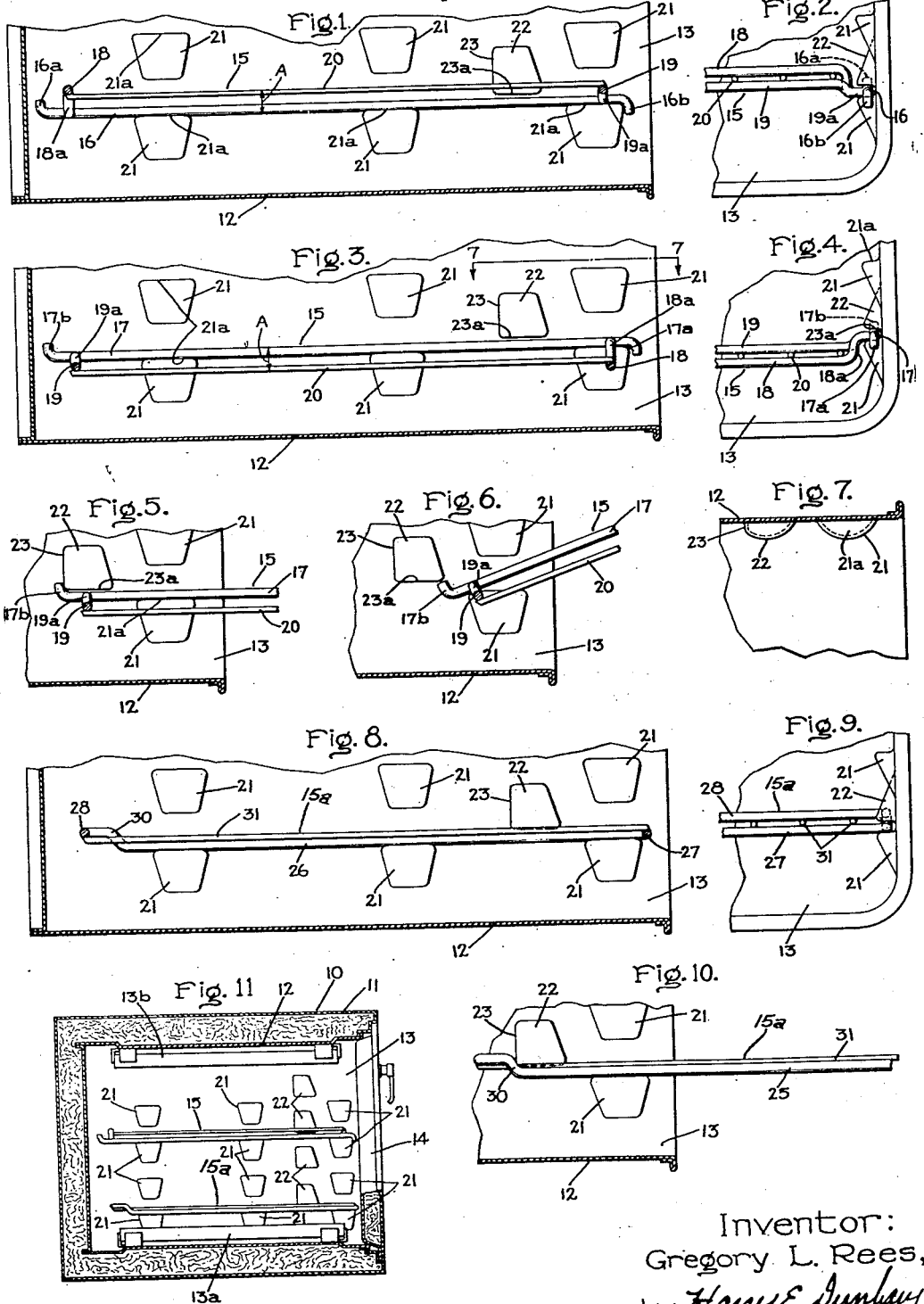
Aug. 1, 1939.   G. L. REES   2,168,172
CABINET RACK
Filed Sept. 11, 1936   2 Sheets-Sheet 1
Inventor:
Gregory L. Rees,
by Harry E. Dunham
His Attorney.

Patented Aug. 1, 1939

2,168,172

UNITED STATES PATENT OFFICE 2,168,172

CABINET RACK

Gregory L. Rees, La Grange, Ill., assignor to Edison General Electric Appliance Company, Chicago, Ill., a corporation of New York Application September 11, 1936, Serial No. 100,283

4 Claims. (Cl. 211—143)

This invention relates to racks for cabinets, such as ovens, refrigerators and the like, and it has for its object the provision of an improved device of this character.

This invention has special relation to a sliding rack adapted to be moved in and out of the cabinet with which it is associated so that articles can be conveniently placed on or removed from the rack.

This invention contemplates the provision of an improved sliding rack structure involving improved means in the compartment for supporting the rack, for limiting its forward movement in the normal operation of the rack, and providing means whereby the rack can be easily and conveniently removed from and replaced in the cabinet.

This invention further comprehends the provision of an improved rack structure arranged to present a comparatively large number of shelf levels in the compartment.

In accordance with this invention, the shelf structure in one form of this invention comprises a plurality of oppositely positioned protuberances arranged on the side walls of the compartment at spaced intervals from the front to the rear. These protuberances preferably will be formed integrally with and of the material of which the side walls are made. The protuberances present oppositely positioned lines of bearing surfaces at the sides of the compartment upon which the rack is supported. In addition, the side walls are provided with a pair of similarly arranged protuberances but positioned above the line of movement of the rack and presenting lower bearing surfaces facing the rack, and also bearing surfaces facing the rear of the compartment. The former engage the rack when in a withdrawn position to prevent tilting, while the latter function to engage parts of the rack to limit the forward movement of the rack; these protuberances and the parts of the rack with which they engage are so arranged that when the rack is withdrawn to its extreme forward position and its front end elevated and pulled forwardly, the parts on the rack will clear the protuberances and permit the rack to be removed from the compartment.

The rack structure in one form of this invention comprises a pair of side rails arranged to rest upon the supporting protuberances, together with a plurality of longitudinal bars between the side rails defining a shelf and so arranged that by reversing the position of the rack a different shelf level is obtained.

For a more complete understanding of this invention, reference should be had to the accompanying drawings in which Fig. 1 is a fragmentary view in elevation illustrating an oven compartment provided with a rack structure embodying this invention; Fig. 2 is a fragmentary view in front elevation of the compartment and rack structure of Fig. 1; Fig. 3 is a view similar to Fig. 1, but illustrating the rack in a reverse position; Fig. 4 is a view similar to Fig. 2, but illustrating the rack in its reverse position; Figs. 5 and 6 are fragmentary views illustrating the rack in its extreme forward position, and also the position given the rack to withdraw it from the oven; Fig. 7 is a sectional view taken through the line 7—7 of Fig. 3 and looking in the direction of the arrows; Figs. 8 and 9 are views similar to Figs. 1 and 2, but illustrating a rack of modified form; Fig. 10 is a fragmentary view illustrating the rack of Figs. 8 and 9 in its forward position; Fig. 11 is a side elevation mainly in section illustrating an electrically heated oven provided with rack structure arranged in accordance with this invention, the figure being taken on a smaller scale than the previous figures; Fig. 12 is an enlarged perspective view illustrating the rack structure shown in Figs. 1–6 inclusive; and Fig. 13 is an enlarged perspective view illustrating the rack structure of Figs. 8, 9 and 10.

Referring more particularly to Figs. 1 to 7 inclusive and 11, this invention has been shown as applied to a rack structure intended to be used in connection with an electrically heated oven. It is to be understood, however, that this invention is applicable equally as well to refrigerator cabinets and other devices having cabinets wherein a shelf structure is used. As shown in Fig. 11, the oven 10 comprises walls 11 defining an outer casing. This outer casing is of rectangular form having top and bottom walls, an end wall, and a pair of side walls. The front is open to receive an inner lining 12 defining a heating chamber 13. This chamber or compartment 13 likewise has a pair of side walls, an end wall and top and bottom walls. The front of the compartment 13 is normally closed by a door 14. The compartment is provided with an electrical heating element 13a at the bottom, and an electrical broiling element 13b at the top. Arranged within the oven are a plurality of openwork rack structures 15 and 15a arranged at different levels, as shown in Fig. 11. The rack structures 15 and 15a may be of the same construction, or they may have different constructions, as shown.

The rack structure 15 is shown more specifically in Figs. 1 to 6 and 12. As shown in these figures, the rack 15 has a pair of supporting rails 16 and 17 at the sides. The rails 16 and 17 are connected at the front and rear, as viewed in Fig. 12, by a pair of transverse bars 18 and 19. The bars 18 and 19 support a plurality of longitudinal bars 20 arranged at spaced intervals crosswise of the rack, as shown, and arranged in substantially parallel relation with each other and with the rails 16 and 17. The bars 18 and 19, as shown, have a shallow extended U form, the legs of the bars being secured directly to the rails 16 and 17. Preferably, the legs terminate in extensions 18a and 19a respectively arranged substantially parallel with the body of the bars, and these extensions are connected at their outer extremity to the side rails 16 and 17 in any suitable manner, as by spot welding. The bar 18 has a somewhat deeper U than has the bar 19. Each longitudinal bar 20 at its front end is secured to the upper surface (Fig. 12), that is, the inner surface of the base of the U bar 18, whereas the opposite end of the bar 20 is connected to the under or outer surface of the base of the U bar 19.

The rails 16 and 17 are supported by a plurality of protuberances or projections 21 positioned oppositely each other in the side walls of the oven compartment, and arranged in alignment at spaced intervals from the front to the rear of the compartment, as clearly shown in Figs. 1, 3 and 11. In the specific example illustrated, there are three protuberances 21 in each line on each side of the oven. The protuberances 21 are formed of the material of which the side walls are made. Preferably, they will be stamped out of the stock of the material in any suitable manner, as by means of suitable embossing or drawing dies operated by a suitable punch press. The protuberances 21 are provided with upper bearing surfaces 21a lying in a common plane which are arranged to receive the associated guide rails 16 and 17. It will be observed in view of this arrangement that when the rack is mounted in the oven with its two rails 16 and 17 on the oppositely positioned protuberances 21, it can be slid back and forth in the oven on the protuberances.

The rack 15 is arranged to be positioned on the supporting protuberances 21 either when in the position shown in Figs. 1 and 2, or when in the reverse position shown in Figs. 3 and 4. In the position shown in Figs. 1 and 2, the parts are so arranged that the end bar 18 is at the rear of the compartment, while the end bar 19 is at the front. In this position of the rack, the longitudinal bars 20 are supported in an elevated position with reference to the plane of the rails 16 and 17. This establishes a shelf having a predetermined level in the oven compartment. In the reverse position of the rack shown in Figs. 3 and 4, the position of the side rails 16 and 17 is reversed with reference to the sides of the oven compartment, and the end bar 19 is at the rear of the compartment, while the end bar 18 is at the front. In this position of the rack, the longitudinal bars 20 are supported in a plane below the level of the plane of the side rails 16 and 17. In this position, the longitudinal bars establish a shelf area at a lower level than the level of the shelf in Figs. 1 and 2. It is lower by double the distance between the outer edges of the rails 16, 17 and 20. This distance is indicated by the letter A in Figs. 1 and 2. In order to provide a still larger number of shelf levels in the oven compartment, a plurality of rows of supporting protuberances 21 may be provided one above the other, as shown. When the rack is in its position shown in Figs. 1 and 2, the bar 18 provides a stop to prevent utensils or food from being pushed off of the rear of the rack. The bar 19 acts as a stop in the reverse position of the rack shown in Figs. 3 and 4.

In order to limit the forward movement of the rack, a pair of protuberances 22 is provided on the opposite side walls of the oven above the line of movement of the rack and adjacent the front of the oven compartment. The protuberances 22, however, are spaced somewhat to the rear of the foremost supporting protuberances 21. Each protuberance 22, as shown, is provided with a bearing surface 23 facing the rear of the compartment. The rack 15 is provided with suitable means for engaging these surfaces to limit its forward movement. For this purpose, the ends of the rails 16 and 17 are turned away from the rail in opposite directions substantially at right angles to the rail; as shown, the ends 16a and 17a at the front end of the rack, as viewed in Figs. 3 and 12, are turned downwardly, whereas the ends 16b and 17b at the opposite end are turned upwardly in the reverse direction. The associated ends 16a and 17a, and 16b and 17b cooperate with the bearing surfaces 23 to limit the forward movement of the rack in its respective positions shown in Figs. 1 and 2, and 3 and 4. In each of these positions of the rack, the bent ends of the side rails at the rear will be turned upwardly so that when the rack is moved forward to its position shown in Fig. 5, the upturned ends will engage the bearing surfaces 23 to prevent further movement of the rack forward. In the case shown in Fig. 5, the rack has the same position it has in Figs. 3 and 4, and in this case the bent ends 16b and 17b will engage the stop protuberances 22 at the sides. The operation of the rack when in the reverse position of Figs. 1 and 2 in its relation to the stops is the same except that in this case, the ends 16a and 17a will be upturned and will function to engage the stops to limit forward movement.

The stop protuberances 22 have the added function of preventing tilting of the rack when it is in its withdrawn position shown in Fig. 5. For this purpose, the protuberances have lower bearing surfaces 23a spaced slightly above the side rails 16 and 17 and acting on them to prevent tilting of the forward end downwardly in the withdrawn position of the rack shown in Fig. 5.

In order to remove the rack 15 from the oven either to reverse its position at the same level, or to move it to a different row of supporting protuberances 21, the rack is moved to its position shown in Fig. 5 and then the front end of the rack is elevated and drawn forward as shown in Fig. 6. The front end will be elevated to such an extent that the up-turned ends 16b and 17b will clear the stop abutment 22, as shown in Fig. 6. The rack may then be withdrawn completely from the oven. The rack may be inserted by the reverse operation. In other words, it is moved substantially to its position shown in Fig. 6 and then is moved back into the oven until the up-turned end clears the stop abutments 22, whereupon the rack may be lowered to its proper position and moved back into the oven. These operations of removing and inserting the rack are the same when the rack is in the reverse position of Figs. 1 and 2.

It will be observed in view of the foregoing description that I have provided a rack which is movable to a plurality of levels in the oven compartment, and further, which can be reversed to establish two shelf levels for each level of the rack. This is very important where the oven is provided with a broiling unit at the top, such as the unit 13b. If the rack 15 is placed on the upper tier of supporting projections 21, it may be positioned with its rack shelf uppermost, as clearly shown in Figs. 1 and 2 so that the meat or other edible being broiled is placed very close to the broiler unit for preliminary searing and the like. The rack may then be removed and reversed so as to lower the level of the shelf with reference to the unit for the purpose of completing the cooking operation.

The rack 15a shown in Figs. 8, 9, 10 and 13, and in the lower portion of the oven of Fig. 11, is not reversible. In this form of the invention, the rack 15a comprises supporting side rails 25 and 26 and front and rear bars 27 and 28 formed of a single bar piece 29 bent upon itself in substantially rectangular form, as shown in Fig. 13. The side rails 25 and 26 at their rear are bent upwardly and rearwardly to define shoulders 30. This elevates the rear bar 28 somewhat above the level of the front bar 27 so as to form a utensil and food stop at the rear. A plurality of longitudinal bars 31 are spaced at intervals crosswise of the rack and between the front and rear bars 27 and 28. As shown, the bars 31 are secured to the upper surface of the front bar 27, as viewed in Fig. 13, and to the under surface of the rear bar 28. They may be secured to the front and rear bars in any suitable manner, as by spot welding.

The rack 15a is mounted on the supporting protuberances 21 as shown in Figs. 8, 9, 10 and 11. In Figs. 8 and 11, the rack is in its completely retracted position. In Fig. 10, it is shown in its forward position. It will be observed that when the rack is in this position, the shoulders 30 engage the stop abutments 22 to prevent further movement of the rack forward. In this case, as before, the abutments 22 also function to prevent tilting of the rack.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In an electric oven compartment, a sliding shelf structure comprising a series of protuberances formed outwardly from the stock of the side walls of said compartment spaced at intervals from the front to the rear of the compartment, the protuberances of each side wall have flat upper bearing surfaces in substantially the same plane, an openwork rack mounted on said bearing surfaces for sliding movement forward of said compartment, each side wall also having a protuberance formed outwardly from its stock above the rack adjacent the front, but spaced to the rear of the rack supporting protuberance at the front and having a lower bearing surface above the rack in a plane substantially parallel with and spaced above the plane of said bearing surfaces of the rack supporting protuberances, said lower bearing surfaces arranged to engage the rack to prevent tilting of the rack when it is moved forwardly, said protuberances above the rack also having bearing surfaces facing the rear, and said rack having up-turned members at the rear arranged to engage said rear bearing surfaces to limit the forward movement of said rack, and arranged to pass under said protuberances above the rack when the front end of said rack is raised and pulled forward to permit said rack to be removed from said compartment.

2. A reversible rack structure for ovens and like compartments comprising a pair of longitudinal supporting rails at the sides, a pair of shallow elongated U-shaped cross bars at the front and rear connecting said rails, one of said bars having a deeper U than the other and a plurality of longitudinal bars spaced apart crosswise and having one end connected to the inner side of the base of the U of the deeper cross bar and the other connected to the outer side of the base of the shallower cross bar.

3. In an oven compartment and the like, rack supports at the sides of said compartment, a rack having supporting members defining a surface, oppositely positioned supporting rails for said supporting members adapted to be mounted on said supports, means connecting said members to said rails to support them on one side of a plane through the rails so that when the rack is in one position with the rails on said supports, the members are supported at one level, and are supported at another level by said rails when the rack is turned over and placed on said supports in the reverse position, stops adjacent the front of said oven on opposite sides thereof, and said rack having portions extending in opposite directions, the portions extending in one direction arranged to engage said stops to limit forward movement of the rack when it is in said one position, and those extending in the opposite direction engaging said stops to limit forward movement of said rack when it is in said reverse position.

4. A reversible rack structure for a compartment comprising a pair of longitudinal supporting rails at the sides, a pair of shallow elongated U-shaped cross bars at the front and rear connecting said rails, one of said bars having a deeper U than the other, and a plurality of longitudinal bars spaced apart crosswise and having one end connected to the inner side of the base of the U of the deeper cross bar and the other connected to the outer side of the base of the U of the shallower cross bar so that said longitudinal rails present shelf areas at different levels when said rack is in one position and another when it is turned over in the reverse position, oppositely positioned protuberances on the side walls of said compartment having aligned upper bearing surfaces, a pair of oppositely positioned protuberances on said walls above the line of said bearing surfaces and to the rear of said front opening, said side rails resting on said bearing surfaces in either position of said rack to hold said longitudinal bars in their two shelf positions, the two ends of said rails being curved in opposite directions from said rails and arranged to engage said stop protuberances to limit forward movement of said rack when in either position and said curved ends and stop protuberances arranged so that when the front end of said rack is elevated when the rack is in either position and pulled forwardly the turned ends pass under the protuberances to permit the rack to be removed.

GREGORY L. REES.

Disclaimer 2,168,172.—*Gregory L. Rees*, La Grange, Ill. CABINET RACK. Patent dated Aug. 1, 1939. Disclaimer filed Sept. 25, 1948, by the assignee, *Hotpoint Inc.*

Hereby disclaims claim 1.

[*Official Gazette October 26, 1948.*]